(12) United States Patent
Goodson

(10) Patent No.: US 9,072,327 B2
(45) Date of Patent: Jul. 7, 2015

(54) USING LENSES AND LENS ARRAYS TO ENHANCE THE APPEARANCE OF PEOPLE

(76) Inventor: David Goodson, Hinsdale, IL (US)

( * ) Notice: Subject to any disclaimer, the term of this patent is extended or adjusted under 35 U.S.C. 154(b) by 965 days.

(21) Appl. No.: 13/190,128

(22) Filed: Jul. 25, 2011

(65) Prior Publication Data
US 2012/0019771 A1    Jan. 26, 2012

Related U.S. Application Data

(63) Continuation-in-part of application No. 11/735,576, filed on Apr. 16, 2007, now Pat. No. 7,984,517.

(51) Int. Cl.
*A41D 27/08* (2006.01)
*G02C 5/00* (2006.01)

(52) U.S. Cl.
CPC ............. *A41D 27/08* (2013.01); *G02C 5/001* (2013.01)

(58) Field of Classification Search
CPC .... A41D 27/08; A41O 31/0088; A41F 9/002; G02B 133/0031; G02B 27/214
USPC ............. 2/69, 74, 77, 79, 105, 106, 115, 308, 2/244
See application file for complete search history.

(56) References Cited

U.S. PATENT DOCUMENTS

| | | | | |
|---|---|---|---|---|
| 4,127,128 A * | 11/1978 | Schmidt | ............. | 450/1 |
| 5,421,326 A * | 6/1995 | Rankin et al. | ............ | 128/201.19 |
| 5,562,057 A * | 10/1996 | Lenson | ............. | 112/88 |
| 5,764,680 A * | 6/1998 | Watson | ............. | 372/93 |
| 6,751,024 B1 * | 6/2004 | Rosenthal | ............. | 359/626 |
| 6,970,275 B2 * | 11/2005 | Cannon et al. | ............. | 359/213.1 |
| 7,068,434 B2 * | 6/2006 | Florczak et al. | ............. | 359/626 |
| 7,333,268 B2 * | 2/2008 | Steenblik et al. | ............. | 359/619 |
| 7,336,422 B2 * | 2/2008 | Dunn et al. | ............. | 359/626 |
| 7,468,842 B2 * | 12/2008 | Steenblik et al. | ............. | 359/619 |
| 7,738,175 B2 * | 6/2010 | Steenblik et al. | ............. | 359/619 |
| 2002/0054434 A1 * | 5/2002 | Florczak et al. | ............. | 359/619 |
| 2004/0051952 A1 * | 3/2004 | Raymond | ............. | 359/619 |
| 2005/0018305 A1 * | 1/2005 | Raymond | ............. | 359/618 |
| 2005/0020918 A1 * | 1/2005 | Wilk et al. | ............. | 600/439 |
| 2005/0180020 A1 * | 8/2005 | Steenblik et al. | ............. | 359/626 |
| 2005/0208267 A1 * | 9/2005 | Mazzotta | ............. | 428/137 |
| 2006/0007059 A1 * | 1/2006 | Bell | ............. | 345/55 |
| 2006/0250695 A1 * | 11/2006 | Welch | ............. | 359/516 |
| 2006/0262411 A1 * | 11/2006 | Dunn et al. | ............. | 359/619 |
| 2007/0058260 A1 * | 3/2007 | Steenblik et al. | ............. | 359/626 |
| 2007/0063831 A1 * | 3/2007 | Perkins et al. | ............. | 340/479 |
| 2007/0115651 A1 * | 5/2007 | Murphy | ............. | 362/103 |
| 2007/0245445 A1 * | 10/2007 | Kaye | ............. | 2/69 |
| 2008/0036196 A1 * | 2/2008 | Steenblik et al. | ............. | 283/109 |
| 2008/0037131 A1 * | 2/2008 | Steenblik et al. | ............. | 359/619 |
| 2008/0092265 A1 * | 4/2008 | Gage et al. | ............. | 2/69 |
| 2008/0118862 A1 * | 5/2008 | Dunn et al. | ............. | 430/270.1 |
| 2008/0165423 A1 * | 7/2008 | Steenblik et al. | ............. | 359/626 |
| 2008/0212192 A1 * | 9/2008 | Steenblik et al. | ............. | 359/619 |
| 2008/0212193 A1 * | 9/2008 | Steenblik et al. | ............. | 359/619 |
| 2009/0021840 A1 * | 1/2009 | Steenblik et al. | ............. | 359/626 |
| 2009/0122412 A1 * | 5/2009 | Steenblik et al. | ............. | 359/626 |
| 2009/0158502 A1 * | 6/2009 | Medolla et al. | ............. | 2/227 |
| 2009/0190211 A1 * | 7/2009 | Kodama et al. | ............. | 359/457 |
| 2010/0105284 A1 * | 4/2010 | Policaro et al. | ............. | 450/33 |

* cited by examiner

*Primary Examiner* — Richale Quinn
(74) *Attorney, Agent, or Firm* — C. John Brannon; Brannon, Sowers & Cracraft PC

(57) ABSTRACT

A variety of applications of the integration of lenses and lens arrays into clothing, eyewear, and other worn articles so as to enhance or alter the appearance of a wearer are disclosed.

4 Claims, 12 Drawing Sheets

USING LENSES AND LENS ARRAYS TO ENHANCE THE APPEARANCE OF PEOPLE

CROSS REFERENCE TO RELATED APPLICATIONS

This application is a Continuation in Part of U.S. application Ser. No. 11/735,576 filed on Apr. 16, 2007 now U.S. Pat. No. 7,984,517.

FIELD

The described technology relates generally to lenses and more particularly to the integration of lenses with other materials to alter the appearance of people.

BACKGROUND

Clothing has the dual task of protecting the wearer from environmental hazards as well as enhancing the wearer's appearance. People often rely upon their clothing to provide. Traditionally, clothing has included restrictive corseting to aid in the appearance of smaller waistlines and/or supportive members to lift sagging body parts. While effective, these corseting and support members are uncomfortable and may cause injury from extended wear due to restriction of blood flow and the like.

Thus, there is a need for clothing that enhances the appearance of the wearer without attendant discomfort or risk of injury. The technology disclosed below addresses this need.

SUMMARY

The novel technology relating to optically enhanced packaging is set forth in the claims below, and the following is not in any way to limit, define or otherwise establish the scope of legal protection. In general terms, the described technology relates to a variety of applications of lens arrays to alter and enhance the appearance of a variety of objects including people and merchandise.

One object of the novel technology is to provide improved clothing.

Further objects, embodiments, forms, benefits, aspects, features and advantages of the described technology may be obtained from the description, drawings, and claims provided herein.

DESCRIPTION

Figure 1:
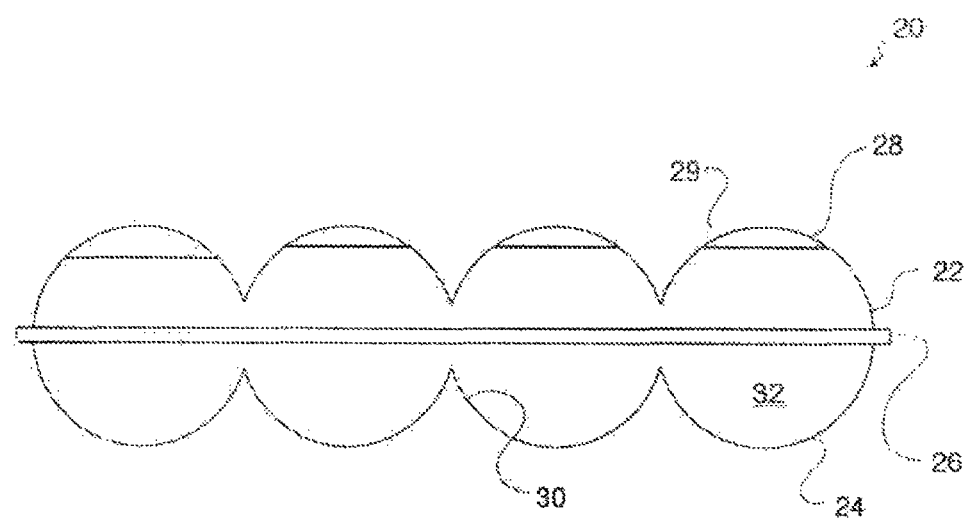
FIG. 1 is a side view of packaging according to one example of the novel technology.

For the purposes of promoting an understanding of the principles of the described technology and presenting its currently understood best mode of operation, reference will now be made to the embodiments illustrated in the drawings and specific language will be used to describe the same. It will nevertheless be understood that no limitation of the scope of the described technology is thereby intended, with such alterations and further modifications in the illustrated device and such further applications of the principles of the described technology as illustrated therein being contemplated as would normally occur to one skilled in the art to which the described technology relates.

The refractive properties of lenses have long been used to alter the appearance of objects. Refraction can shift the apparent position of objects making them appear closer, more distant, larger, or smaller than they really are. Additionally, rotation of a lens can further alter the appearance of objects by either shifting where the resulting image can be viewed. Plastics and composite materials replacing traditional glass in lens production as well as design improvements, such as the Fresnel lens, thin film lenses, cylindrical style lenses, and lenticular arrays, have led to the creation of thinner and lighter lenses. Newly developed metamaterials have been created that have a negative index of refraction. Metamaterials having a negative index of refraction still obey Snell's law, but light is refracted to the same side of normal, contrary to traditional refractive materials.

These and other advances in lens and optics technology have led to the opportunity for new applications of lenses and lens arrays. Packaging materials used in retail environments must often both protect the items being sold as well as display them in an attractive manner. The integration of one or more lenses or lens arrays with the packaging material would allow for the objects in the packaging to be displayed in a more desirable fashion. The packaging may be relatively small, such as a carton for eggs, or relatively large, such as the exterior of an automobile. Additionally, lenses or lens arrays incorporated into clothing such as shirts, belts, pants, boots and the like would allow the wearer to alter the appearance of particular parts of the body. For example, clothing could be designed which narrows the appearance of the waist while enlarging the appearance of the chest or bust line. The disclosed technology provides a variety of applications of integrated of lenses and lens arrays so as to enhance the appearance of objects and people.

FIG. 1 shows a side view of a packaging material 20 according to one example of the novel technology. In this particular example, packaging 20 comprises a top lid portion 22 and a bottom base portion 24 which are at least partially removably joined at a connecting portion 26. Top portion 22 and bottom portion 24 are generally hemispherically shaped in this particular example so as to form a plurality of spherical compartments 32 sized and configured so as to hold the object or objects to be stored and displayed. In other examples, top portion 22 and bottom portion 24 are generally square, rectangular, or some other shape so as to accommodate the size and shape of the object or objects to be displayed.

Top portion 22 further includes at least one lens portion 28 corresponding to each compartment 32. In this particular example, lens portion 28 is a convex lens sized and configured so as to magnify an object disposed within compartment 32. In other examples, lens portion 28 may be a concave, convex, lenticular array, prism, meniscus, Fresnel, negative Fresnel, or other type lens or may include a plurality of lenses of the same or different types. Further, the lens portion 28 may include a plurality of lenses arranged as an array or a series of stacked arrays. In still other examples, lens portion 28 is a lenticular lens array configured so as to shift the apparent location of objects within the compartment when viewed from a first particular direction but not when viewed from a second, typically orthogonal direction. In still other examples, lens portion 28 further includes a filter material 29 configured so as to allow particular wavelengths of light to pass through the filter while blocking other wavelengths. Optionally, top portion 22 excluding the lens portion may be transparent or opaque as desired and may be fabricated from plastic, glass, cardboard or other paper product, wood, metal, or any other suitable material. Lens portion 28 may be made of plastic, glass, composites, microfiber tubules filled with a refractive liquid, or any other suitable material or metamaterial having the combination of strength, weight, and refractive index able to produce the desired optical effect.

In this particular example, bottom portion 24 includes a retroflective material 30 which reflects light generally back along the incident light beam. In one example, the retroflective material may be positioned elsewhere (such as in the top portion 22) and/or may comprise an array of beads made of glass, plastic, or other suitable material. In another example, the retroflective material comprises reflective cube corners as is known in the art. Other retroflective materials may also be used, although none are required. Optionally, bottom portion 24 may be transparent or opaque as desired and may be fabricated from plastic, glass, cardboard or other paper product, wood, metal, or any other suitable material.

Figure 2:
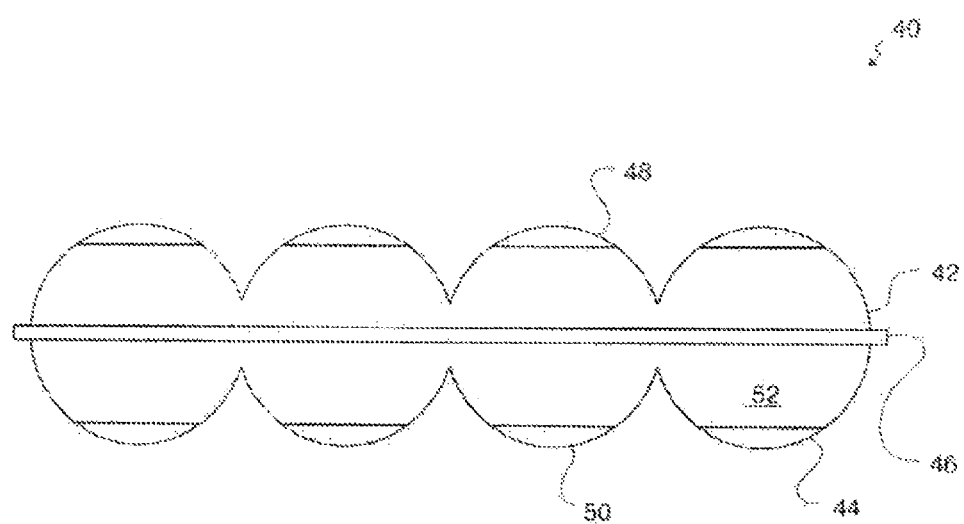
FIG. 2 is a side view of packaging according to another example of the novel technology.

FIG. 2 shows a side view of a packaging material 40 according to another example of the described technology. In this particular example, packaging 40 comprises a top lid portion 42 and a bottom base portion 44 which are removably or hingedly joined at a connecting portion 46. Top portion 42 and bottom portion 44 are generally hemispherically shaped in this particular example so as to form a plurality of spherical compartments 52 sized and configured so as to hold the object or objects to be stored and displayed.

Top portion 42 further includes at least one lens portion 48. In this particular example, lens portion 48 is a convex or meniscus lens sized and configured so as to magnify an object disposed within compartment 52. In other examples, the lens portion 48 is a concave, Fresnel, or other type lens or lenses. In still other examples, lens portion 48 is a lenticular lens array configured so as to shift the apparent location of objects within the compartment when viewed from a particular direction but not when viewed from a second, generally orthogonal direction. In still other examples, lens portion 48 further includes a filter material.

In this particular example, bottom portion 44 includes at least one lens portion 50 corresponding to each compartment 52. In this particular example, lens portion 50 is a convex lens configured so as to magnify an object disposed within the compartment 52. Lens arrays 48, 50 may have the same or different magnification properties. For example, lens array 48 may have slight magnification properties so as to enhance the upper surface of the object disposed in the compartment while lens portion 50 has stronger magnification properties to allow for easier reading of an instruction label located on the bottom surface of the object. In another example, both lens arrays 48, 50 have generally equal powers of magnification so as to enhance viewing of a plurality of small objects disposed within the compartments. Optionally, top portion 42 and bottom portion 44 excluding lens portions 48, 56 may be transparent or opaque as desired and may be fabricated from plastic, glass, cardboard or other paper product, wood, metal, or any other suitable material. Lens portions 48, 56 are typically sized and configured so as to magnify objects disposed in the packaging material to a greater or lesser degree as desired.

Figure 3:
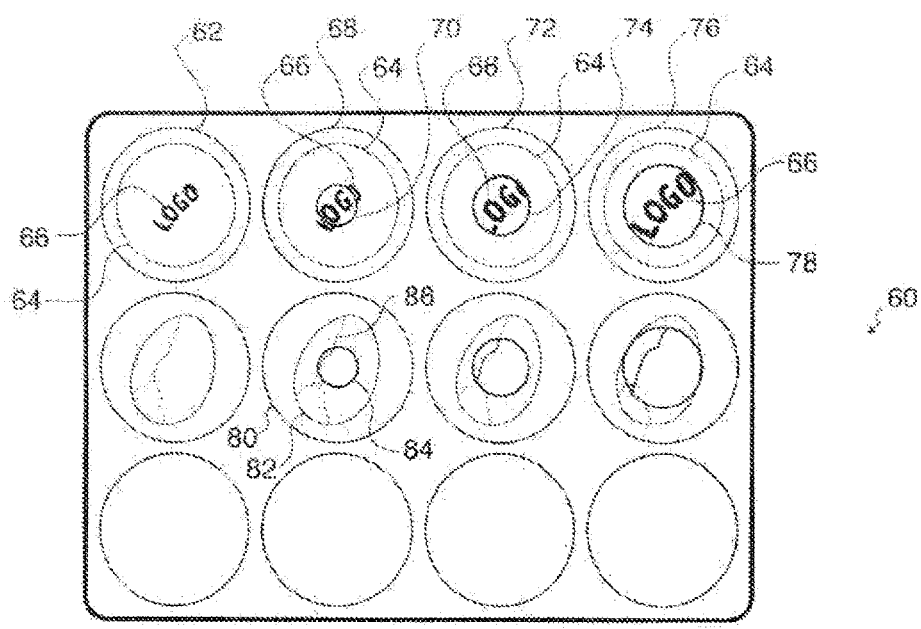
FIG. 3 is a top plan view of packaging according to still another example of the novel technology.

A top plan view of still another example of packaging according to the disclosed technology is shown in FIG. 3. In this particular example, the packaging 60 includes a plurality of compartments 62, 68, 72, 76 which are sized and configured so as to accommodate merchandise 64 having a generally rectangular label 66 affixed to the surface of the merchandise. Compartment 62 does not include a lens portion so the label and merchandise is unmagnified. Compartment 68 includes a lens portion 70 sized and configured so as to magnify a portion of the label 66. Compartment 72 includes a lens portion 74 sized and configured so as to magnify a portion of the label 66 to a greater degree than lens portion 70. Compartment 76 includes a lens portion 78 sized and configured so as to magnify a portion of the label 66 to a greater degree than lens portion 74. In addition to magnification of labels, lens portions may also be sized and configured to display defects in objects disposed in the compartments. For example, an egg 82 disposed in a compartment 80 includes a crack 86 in the surface of the egg. The crack 86 is magnified by a lens portion 84 so the package with the defective product may be removed from the shelf before being purchased by a customer. Typically, the lens portion 70, 74, 78 of compartments 68, 72, 76 have substantially similar magnification capabilities. Optionally, packaging according to the novel technology includes display compartments having lens portions 70 with differing powers of magnification.

While the preceding paragraphs have described the packaging of goods and objects, lenses that are incorporated with clothing may be employed to alter the appearance of people either by enhancing desirable features or by minimizing undesirable features. The overall appearance of a person is formed by the appearance of individual portions of a person's body (e.g., the face, forehead, shoulders, arms, bust, hips, waist, legs, feet, etc.) and the interaction of these various individual portions (e.g., the ratio of the width of the shoulders to the width of the hips). By altering the look or appearance of a single portion of the body it is possible to alter the overall appearance of a person. For example, the appearance of a man may be altered by making his shoulders appear broader than they truly are, or by making the waist appear reduced in size, thereby altering ratio of shoulder width to waist width and giving the man a different overall appearance.

The following examples describe applications which alter the appearance of particular parts of the wearer's body, thereby giving the wearer a different overall appearance or look. In these examples, lenses, lens arrays, prisms, and/or prism arrays may be incorporated into or attached to clothing or accessories or attached directly to the wearer's body. These examples are for illustrative purposes only and it is understood that other examples of the novel technology may be used to alter the appearance of other portions of a wearer's body to give the wearer a difference overall appearance.

Figures 4A, 4B:
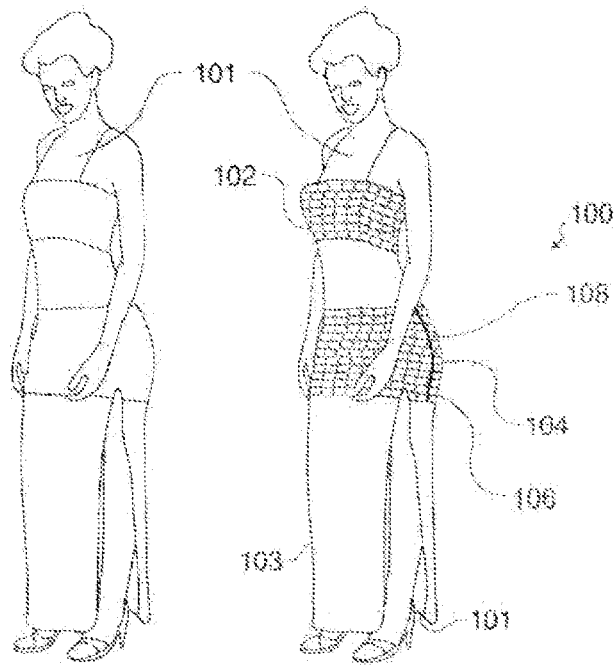
FIG. 4A is a perspective view of clothing without the benefit of the novel technology.
FIG. 4B is a perspective view of clothing the clothing of FIG. 4A including attached optics according to one example of the novel technology.
Figures 5A, 5B, 5C, 5D:
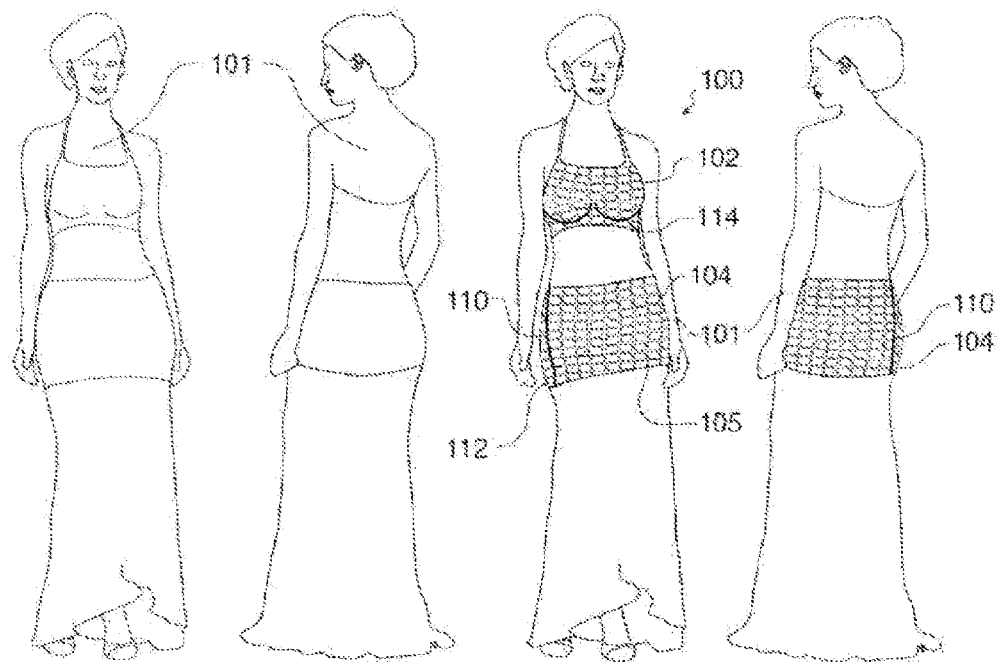
FIG. 5A is a front view of the clothing shown in FIG. 4A.
FIG. 5B is a rear view of the clothing shown in FIG. 4A.
FIG. 5C is a front view of the clothing shown in FIG. 4B.
FIG. 5D is a rear view of the clothing shown in FIG. 4B.

FIG. 4B is a perspective view of an article of clothing 100 according to one example of the described technology. In this particular example, clothing 100 includes a first lens array 102 and a second lens array 104 positioned over separate parts of the wearer's 101 body. (FIGS. 4A, 5A and 5B illustrate the wearer 101 similarly clothed but without the lens arrays 102, 104 for comparison). Lens arrays 102, 104 may include convex, concave, Fresnel, lenticular, prisms, or portions thereover, and/or other suitable types of lenses, arrays, or prisms to achieve the desired effect. Optionally, lens arrays 102, 104 may comprise two or more lenses positioned such that light passes though a first lens before passing through a second lens (i.e., "stacked" on top of one another). Stacking lens arrays alters the overall focal length of the array and/or increases the area visible through the stacked array. In this particular example, lens array 102 comprises an array of lenticular lenses sized and configured so as to magnify the appearance of the wearer's bust line 114. Lens array 104 comprises an array of lenticular lenses sized and configured so as to shift the apparent position of the wearer's hips, waistline, and lower torso inward from their actual position, thereby minimizing the appearance of the wearer's hips, waistline, and lower torso.

As shown in FIG. 5, the apparent location 110 of the wearer's hip is shifted by lens array 104 from the actual location 112 of the wearer's hip, thereby giving the wearer a slimmer appearance. The lens array may 104 further include a filter material 105 configured so as to allow particular wavelengths of light to pass through the filter while blocking other wavelengths thereby altering the color of the clothing located under the lens array 104. Lens arrays 102, 104 may be affixed to the clothing 100 using thread, glue, adhesives, or other suitable means. Alternatively, lens arrays 102, 104 are removably mounted to clothing 100 such as by hooks, buttons, clasps, straps, spacers, hook-and-loop fasteners such as Velcro®, or other suitable mounting means. In other examples, lens arrays 102, 104 are mounted at a distance from the exterior surface 103 of the clothing so as to achieve and maintain a desired degree of focus using spacers, standoffs, or other suitable means.

Figures 6A, 6B:
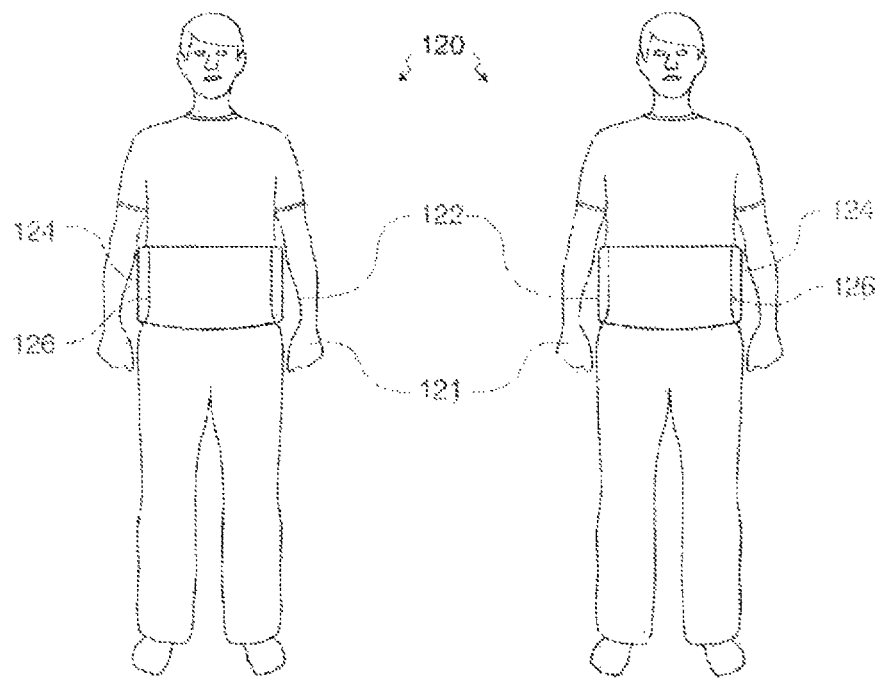
FIG. 6A is a front view of clothing with attached optics according to another example of the novel technology.
FIG. 6B is a front view of the clothing of FIG. 6A with filter properties included in the optics.

FIGS. 6A and 6B are front views of an article of clothing 120 according to another example of the described technology. In these particular examples, clothing 120 includes a lens array 122 positioned over the wearer's 121 waist and stomach. Lens array 122 may include convex, concave, Fresnel, lenticular, prisms, or other suitable types of lenses to achieve the desired image-shifting effect. It should be noted that some types of lenses, such as wedge prisms, penta prisms, right angle prisms, and retro-reflective prisms to not invert or reverse the image, and may be selected accordingly. In this particular example, lens array 122 comprises an array of lenses sized and configured so as to minimize the appearance of the wearer's waistline and stomach area. Lens array 122 may further include a filter to allow light to selectively pass therethrough, such as allowing generally orthogonally incident light to pass through more readily than light at more acute angles. In other words, as the lens array 122 is bent around the wearer 101, the sides of the array 122 become progressively darker, contributing to a slimming effect. The apparent location 126 of the wearer's waistline and flanks are shifted inward from its actual location 124 by refraction and/or filtration effects of the lens array 122, thereby giving the wearer 101 a slimmer appearance.

Figures 7A, 7B, 7C:
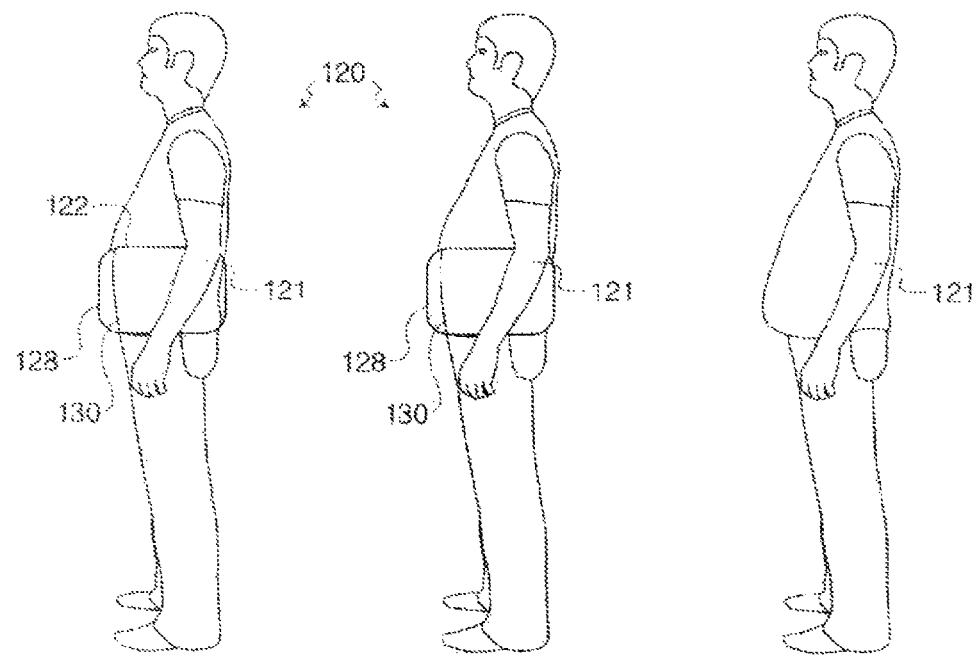
FIG. 7A is a side view of the clothing shown in FIG. 6A.
FIG. 7B is a side view of the clothing shown in FIG. 6B.
FIG. 7C is a side view of the clothing of &A without the novel technology.

As shown in FIGS. 7A and 7B, the apparent location 130 of the wearer's 101 stomach is shifted by lens array 122 from the actual location 128 of the wearer's 101 stomach, thereby giving the wearer 101 a slimmer appearance. FIG. 7C is provided for comparison, showing the wearer 101 in a similar posture but without the lens array 122. In the example shown in FIG. 7B, the lens portion 122 further includes a filter material configured so as to allow particular wavelengths of light to pass through the filter while blocking other wavelengths thereby altering the color of the clothing located under the lens array 122. Lens array 122 may be affixed to the clothing 120 using thread, glue, adhesives, or other suitable means. Alternatively, lens array 122 is removably mounted to clothing 120 such as by hooks, buttons, clasps, straps, hook-and-loop fasteners such as Velcro®, or other suitable mounting means.

Figure 8A:
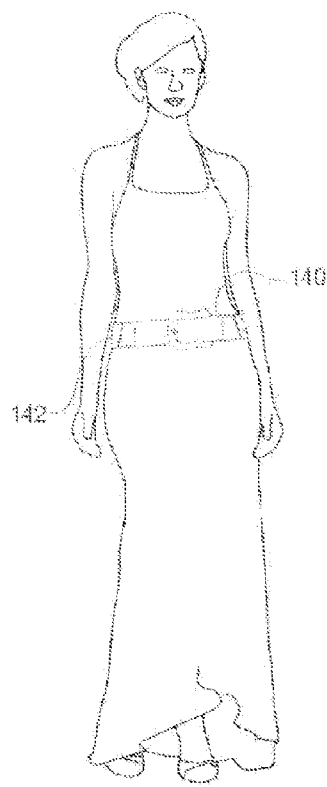
FIG. 8A is a front view of a belt according to one example of the novel technology.
Figure 8B:
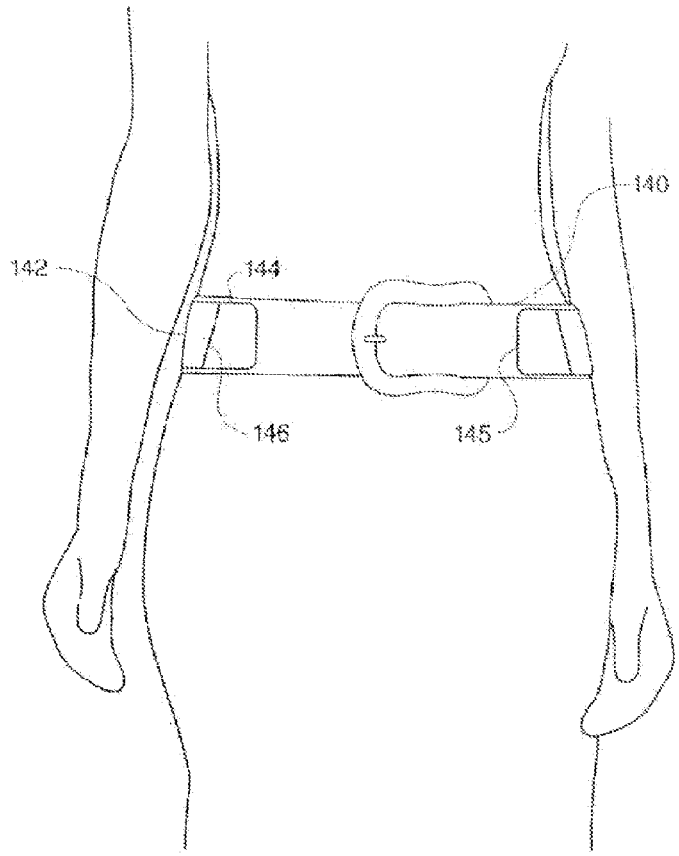
FIG. 8B is an enlarged partial view of FIG. 8A.

Still another example of an article of clothing according to the described technology is shown in FIGS. 8A and 8B. In this example, a belt 140 includes two lens arrays 144, 145 disposed so they are positioned over the wearer's hips 142 when the belt is worn. Typically, a greater number of lens arrays are positioned around the belt such that the waist line appear diminished from all viewing angles, such as six or eight or ten such lens arrays generally evenly distributed around the belt. Lens arrays 144, 145 are configured and arranged so as to shift the apparent position 146 of the wearer's hips inward from their true position 142 so as to create the appearance of a narrower waist. Typically, the lenses 144, 145 are disposed at a distance from the wearer's body to further enhance the image and prevent distortion.

Figure 9:
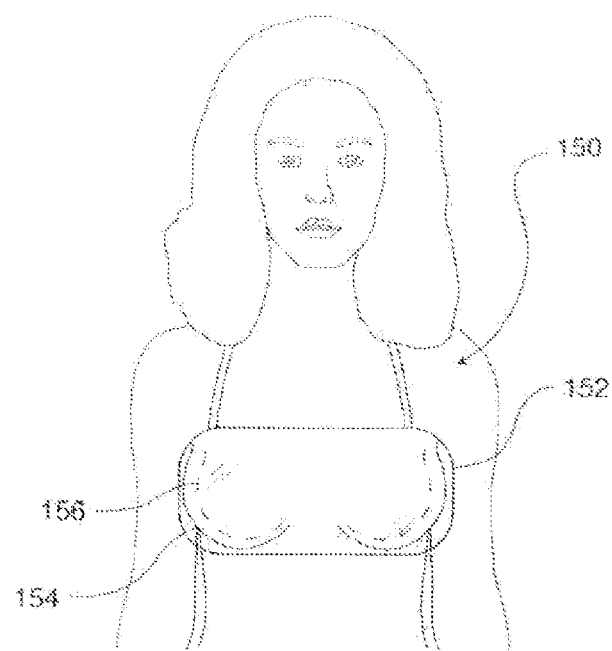
FIG. 9 is a partial front view of clothing according to still another example of the novel technology.

Yet another example of an article of clothing according to the described technology is shown in FIG. 9. In this example, a halter-top 150 includes a lens array 152 which is disposed so as to be positioned over the wearer's bust when the halter-top is worn. Lens array 152 is configured and arranged so as to shift the apparent position 154 of the wearer's bust line from its actual position 156. The lens array 152 enhances the wearer's bust creating the appearance of larger, higher, and fuller breasts.

Figure 10:
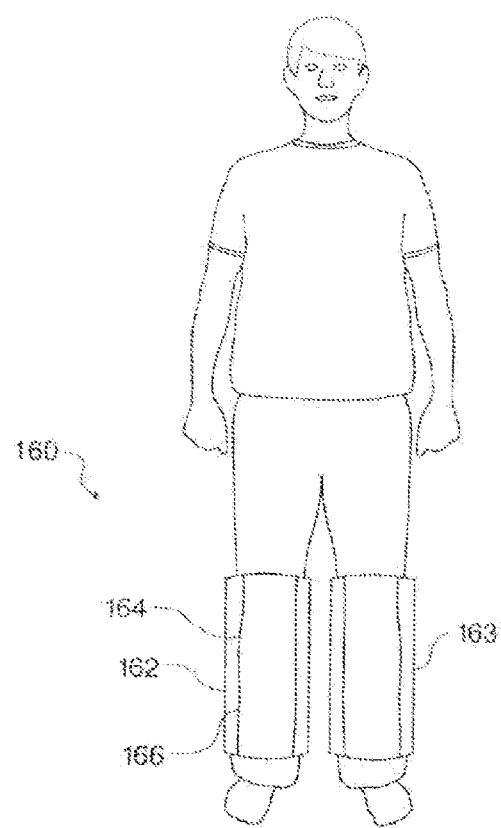
FIG. 10 is a front view of clothing according to still a further example of the novel technology.

Still another example of an article of clothing according to the novel technology is shown in FIG. 10. In this particular example, pants 160 include two lens arrays 162, 163 positioned over the wearer's legs. The lens arrays 162, 163 are configured and arranged so as to shift the image 166 of the wearer's legs 164 making the legs appear longer, and thereby, making the wearer appear taller. Likewise, the lens arrays 162, 163 may be positioned to optically shorten or lengthen any desired feature of the wearer, such as the nose, ears, fingers, legs, arms or the like.

Figure 11A:
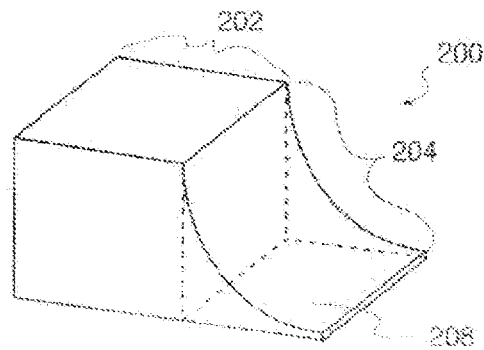
FIG. 11A is a perspective view of a novel image shifting lens according to still another embodiment of the present invention.
Figure 11B:
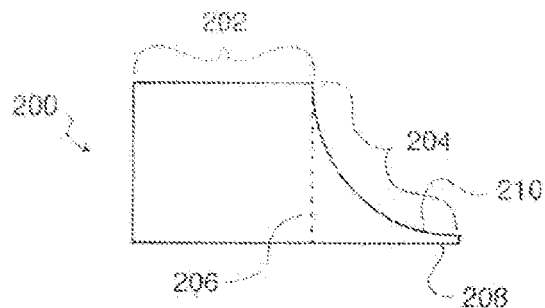
FIG. 11B is a side elevation view of the embodiment of FIG. 11A.
Figure 11C:
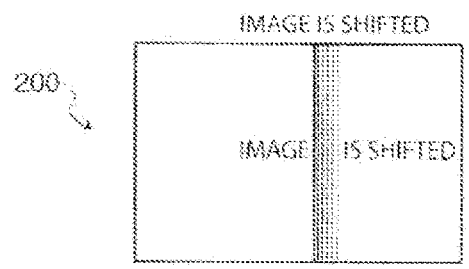
FIG. 11C is a top view of the lens of FIG. 11C.
Figure 12:
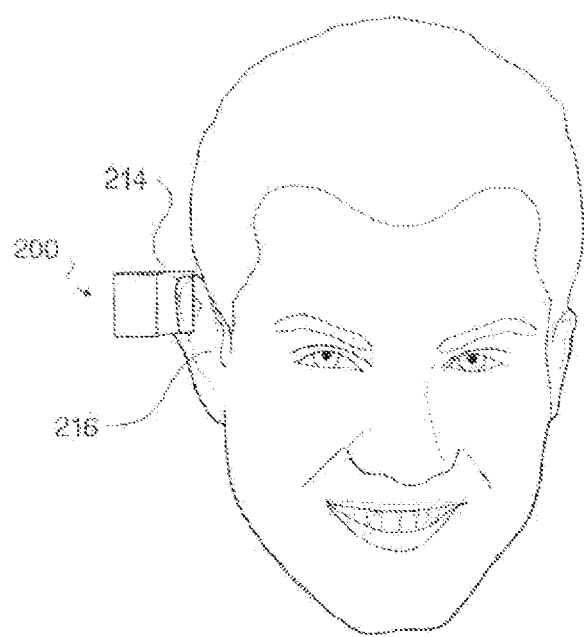
FIG. 12A is a schematic view of the lens of FIG. 11A in use.
FIG. 12B is another embodiment of the lens FIG. 11A.
Figure 12:
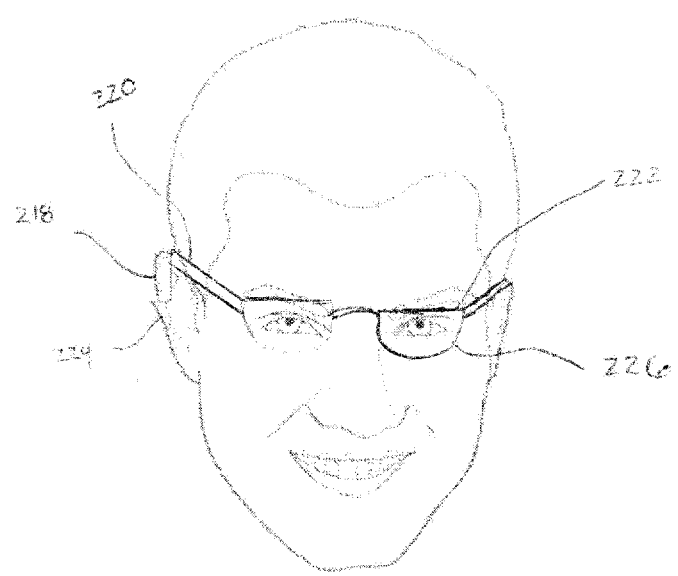

FIGS. 11A-11C illustrate one particular image shifting lens 200 configuration of the present novel technology in greater detail. Lens 200 includes a generally rhombohedral or orthogonally parallelepiped portion 202 with a curved portion 204 extending therefrom. The curved portion 204 typically intersects the rhombohedral portion 202 at generally planar face 206 and includes a bottom generally planar face 208 extending orthogonally from face 206. Curved portion 204 also includes curved surface 210 extending between the planar faces 206, 208. When an image 212 is viewed through lens 200 in a direction orthogonal to the bottom face 208, the portion of the image 212 viewed through the rhombohedral portion 202 remains unshifted, while the portion of the image 212 viewed through the curved portion 204 is shifted away from the rhombohedral portion 202. A practical application of the lens 200 is illustrated as FIG. 12, in which a portion 214 of an ear 216 is optically shifted towards the subject's head, thus making the ear 216 appear smaller. In another embodiment shown in FIG. 12B, the lens described with respect to FIGS. 11A-11C may be attached to or incorporated into the temple arms 220 and/or earpieces of a pair of eyeglasses 222 having a lens frame portion 226 or other eyewear such as sunglasses, goggles, and the like, to alter the appearance of a portion 218 of the subject's ear 224 and/or other portion of the subject's head.

Figure 13A:
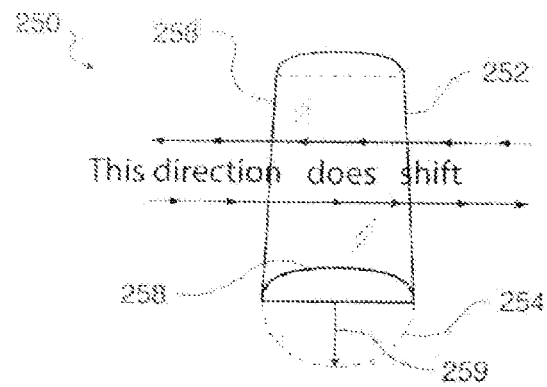
FIG. 13A is a perspective view of a novel lens according to yet another embodiment of the present invention.
Figure 13B:
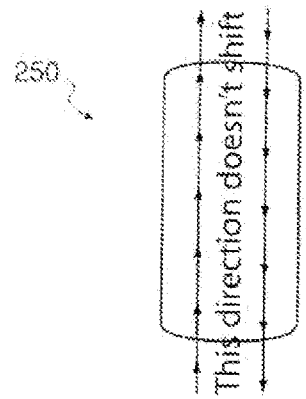
FIG. 13B is a top plan view of FIG. 13A.

FIGS. 13A-13B illustrate another example of an image-shifting lens 250 of the present novel technology. Lens 250 has the general shape of a flattened partial cylinder, as if a cylinder 254 were sectioned by a plane 252 cutting therethrough parallel to its major axis 256 and positioned between the major axis 256 and its surface 258 and defining the bottom portion 252 of the lens 250. The lens 250 magnifies images generally falling along the direction of the major axis 256 when viewed therethrough (see FIG. 13B) and shifts images generally oriented perpendicular to the direction of the major axis 256 when viewed therethrough (see FIG. 13A).

While the described technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the described technology are desired to be protected.

What is claimed is:

1. An article of clothing for altering the appearance of a wearer, comprising:
    an inner surface which faces the wearer and an outer surface; and
    at least one generally transparent lens portion generally adjacent to a portion of the outer surface;
    wherein the lens portion is configured and arranged to alter the appearance of the outer surface;
    wherein the at least one lens portion has a negative index of refraction;
    wherein the at least one lens portion comprises a lens array configured such that the apparent location of the outer surface is shifted from the true location of the outer surface.

2. An article of clothing for altering the appearance of a wearer, comprising:
    an inner surface which faces the wearer and an outer surface; and
    at least one generally transparent lens portion generally adjacent to a portion of the outer surface;
    wherein the lens portion is configured and arranged to alter the appearance of the outer surface;
    wherein the at least one lens portion has a negative index of refraction;
    wherein the at least one lens portion further includes a filter material configured to allow predetermined wavelengths of light to pass through the filter material while stopping other wavelengths of light.

3. An article of clothing for altering the appearance of a wearer, comprising:
    an inner surface which faces the wearer and an outer surface; and
    at least one generally transparent lens portion generally adjacent to a portion of the outer surface;
    wherein the lens portion is configured and arranged to alter the appearance of the outer surface;
    wherein the at least one lens portion has a negative index of refraction;
    wherein the at least one lens portion is removably mounted to the clothing.

4. An article of clothing for enhancing the overall appearance of a wearer, comprising:
    an inner surface which faces the wearer and an outer surface; and
    at least one generally transparent lens portion mounted at a distance from the outer surface and positioned to cover a predetermined portion of the wearer;
    wherein the lens portion is configured and arranged to alter the appearance of the predetermined portion of the wearer so as to alter the overall appearance of the wearer;
    wherein the at least one lens portion has a negative index of refraction.

* * * * *